United States Patent [19]

Pakur et al.

[11] Patent Number: 5,776,272
[45] Date of Patent: Jul. 7, 1998

[54] VEHICLE WHEEL WITH BEADLESS PNEUMATIC VEHICLE TIRE

[75] Inventors: Henryk Pakur, Bückeburg; Roland Jenke, Hademsdorf; Geert Roik, Cremlingen; Rainer Baumgarten, Wietzendorf, all of Germany

[73] Assignee: Continental Aktiengesellschaft, Hanover, Germany

[21] Appl. No.: 703,213

[22] Filed: Aug. 22, 1996

[30] Foreign Application Priority Data

Aug. 23, 1995 [DE] Germany ............ 195 30 939.1

[51] Int. Cl.⁶ .................. B60B 21/02; B60B 21/10; B60C 3/02; B60C 3/06
[52] U.S. Cl. .......... 152/453; 152/456; 152/516; 152/520; 152/375; 152/378 R; 152/379.3; 152/380
[58] Field of Search ................ 152/380, 379.3, 152/378 R, 375, DIG. 20, 453, 520, 516, 456

[56] References Cited

U.S. PATENT DOCUMENTS

| | | | |
|---|---|---|---|
| 468,196 | 2/1892 | Foster | 152/380 |
| 468,560 | 2/1892 | Dorchester | 152/380 |
| 486,542 | 11/1892 | Davies | 152/380 |
| 498,794 | 6/1893 | Huestis | 152/380 |
| 509,164 | 11/1893 | Holt | 152/DIG. 20 X |
| 526,185 | 9/1894 | Goldbacher | 152/380 |
| 688,399 | 12/1901 | Ellis et al. | 152/380 X |
| 1,578,090 | 3/1926 | Paull | 152/380 X |
| 1,919,910 | 7/1933 | Shoemaker | |
| 2,016,150 | 10/1935 | Lee | |
| 3,719,219 | 3/1973 | Horvath et al. | |
| 4,662,418 | 5/1987 | Janus | 152/380 |

FOREIGN PATENT DOCUMENTS

| | | | |
|---|---|---|---|
| 2157076 | 5/1973 | Germany. | |
| 3206171 | 8/1983 | Germany. | |
| WO 85/03909 | 9/1985 | Germany | 152/379.3 |
| 8804522 | 9/1988 | Germany. | |
| 2030526 | 4/1980 | United Kingdom. | |

Primary Examiner—Adrienne C. Johnstone
Attorney, Agent, or Firm—Robert W. Becker & Associates

[57] ABSTRACT

A vehicle wheel has a wheel rim with a radially inwardly positioned mounting surface and rim flanges connected axially to opposite ends of the the mounting surface. A pneumatic vehicle tire with a carcass including at least one carcass ply is provided. The pneumatic vehicle tire has a tread and two sidewalls. The pneumatic vehicle tire is mounted on the inner mounting surface of the wheel rim so as to substantially enclose the mounting surface of the wheel rim. The rim flanges have a radially outwardly projecting end portion serving as axial contact surfaces for a respective one of the sidewalls.

10 Claims, 5 Drawing Sheets

VEHICLE WHEEL WITH BEADLESS PNEUMATIC VEHICLE TIRE

BACKGROUND OF THE INVENTION

The present invention relates to a vehicle wheel comprising a beadless pneumatic vehicle tire made of rubber or a rubber-like material and a radially inwardly positioned wheel rim. The pneumatic vehicle tire comprises a carcass.

Conventional pneumatic vehicle tires are connected with a bead core radially outwardly to the wheel rim. The manufacture of such pneumatic vehicle tires with a bead is very complicated and requires many different materials. In multiple method steps the steel wire must be provided, prepared, connected to rubber material, guided onto the carcass plies during the tire building process, and then positioned and wound together with the carcass. After completed vulcanization the mounting of such a tire axially inwardly at the rim flanges is very difficult and time-consuming due to the pulling resistance of the bead cores required for proper operation. For improving the mounting process, different mounting aids are required. Conventionally, the wheel rims for facilitating the mounting process are in the form of deep-bed wheel rims. For providing a sufficient flexibility of the tire sidewalls for improving the comfort rating of the tire, on the one hand, and providing, on the other hand, the required stiffness of the tire sidewall, at least in the radially inner portion of the tire sidewall, for achieving good handling properties of the tire, it is known to provide within the area of the bead core different reinforcement plies and bead fillers. These measures, however, further complicate the manufacture of the tire sidewall in the area of the bead. Each individual measure and each individual material, in addition to achieving the desired advantages, also imparts certain disadvantages to the tire. In tire areas such as the bead core, which are difficult to manufacture due to the plurality of materials and method steps, a very complicated system of interactions results which may negatively affect in different ways and to different degrees the tire quality. For designing such a pneumatic vehicle tire, the degrees of freedom for changing the components in order to improve the tire properties in the area affected by the bead core is thus greatly limited due to the number of interactions.

Tires are known in which the pneumatic vehicle tire is attached with the bead core radially inwardly of the wheel rim. This provides for emergency running properties within the radially outer area of the wheel rim. However, the problems during bead core building are still the same. The mounting of the bead core radially inwardly of the wheel rim requires also additional devices and additional mounting steps due to the high pulling resistance of the bead core.

From U.S. Pat. No. 1,919,910, a vehicle tire is known in which a beadless tire is fastened radially inwardly at the inner side of the wheel rim in circumferential grooves with additional clamping rings.

From German Offenlegungsschrift 2 157 076 a vehicle wheel with a beadless pneumatic vehicle tire with two carcass plies is known. Radially outwardly bent rim flanges of the wheel rim extend into a circumferential slot at the radially inner end of each tire sidewall between the carcass plies so that the two carcass plies enclose the rim flange from the axially inner and axially outer side. The tire sidewalls are thus connected axially inwardly as well as axially outwardly directly to the rim flange and are thus form-fittingly anchored. The rim flange provides a very stiff embodiment in the radially inner area of the tire sidewall. However, the flexibility of the sidewall required for excellent comfort properties must be provided completely within the sidewall area radially outwardly of the rim flanges because a radial compression of the sidewall with elastic deformation in the area of the rim flange is not possible. In order to be able to provide good comfort properties, the rim flange can be embodied only with a very short length so that, however, the stiffness of the sidewall is reduced and the handling properties are therefore also reduced. The attachment in the area of the rim flange, the thus resulting complete stiffness in the area of the rim flange, and the thus resulting reduction of the flexibility area only to the radially outwardly positioned sidewall portion between the rim flange and the tire shoulder thus allow only for a selected optimization of either good handling properties with an especially large rim flange or of especially good comfort properties by providing an especially small rim flange while accepting reduced driving comfort and handling properties.

From German Offenlegungsschrift 32 06 171 a beadless pneumatic vehicle tire is known having sidewalls connected with the radially inner area to rim flanges of a wheel rim that extend from axially inwardly to radially outwardly in a curved fashion. Such a design only allows, due to fastening the tire sidewall at the rim flange, an optimization of especially good handling properties or especially good comfort properties as a function of the selected rim flange length while accepting reduced comfort, respectively, handling properties.

It is therefore an object of the present invention to provide vehicle wheels with beadless pneumatic vehicle tires of rubber or rubber-like material which comprise a carcass with optimized handling and with optimized comfort properties.

SUMMARY OF THE INVENTION

The vehicle tire according to the present invention is primarily characterized by:

A wheel rim with a radially inwardly positioned mounting surface and rim flanges connected axially to opposite sides of the mounting surface;

A pneumatic vehicle tire with a carcass comprised of at least one carcass ply;

The pneumatic vehicle tire having a tread and two sidewalls;

The pneumatic vehicle tire mounted on the inner mounting surface of the wheel rim so a to substantially enclose the mounting surface of the wheel rim;

The rim flanges each having a radially outwardly projecting end portion serving as axial contact surfaces for a respective sidewall.

Advantageously, the pneumatic vehicle tire has a tire height H and the end portions have a radial extension identical to 0.15 to 0.55 times the tire height H.

The end portions in a preferred embodiment of the present invention have a radial extension identical to 0.2 to 0.3 times the tire height H.

The end portions preferably are radially outwardly curved and have a radially outwardly decreasing stiffness.

Advantageously, the end portions, in a cross-section taken in the plane of the wheel rim extending through a center axis of the vehicle wheel, have a contour continuously tapering in the radially outward direction.

Preferably, the end portions are comprised of a flexible material, selected from the group consisting of an aluminum alloy, a magnesium alloy, and a plastic material, and are chemically connected to the wheel rim.

Expediently, the pneumatic vehicle tire completely encloses the wheel rim.

Preferably, the pneumatic vehicle tire has a height to width ratio of maximally 0.6.

The end portions expediently form an emergency running surface.

Advantageously, the pneumatic vehicle tire is vulcanized to the mounting surface.

The attachment of the pneumatic vehicle tire with its sidewalls at the radially inwardly positioned mounting surface of the wheel rim provides a secure force transmission between the pneumatic vehicle tire and the wheel rim in the circumferential direction and in the axial as well as the in the radial direction. The embodiment of the wheel rim with end portions of its axial rim flanges extending radially outwardly, thus providing substantially axially extending support surfaces for the corresponding tire sidewalls, enables the inwardly positioned wheel rim with its end portions to support the tire sidewalls in the axial direction. Thus, during handling, the wheel rim flanges stiffen the axially inwardly positioned and especially greatly loaded sidewall. During normal driving operation the sidewall in the area of the rim flanges remains flexible. Upon force impacts the entire tire sidewall area can deform elastically for damping purposes. Without great loading of individual sidewall areas an optimal compression and damping is thus possible. Thus, with the present invention, a pneumatic vehicle tire without complicated bead core embodiment is provided that achieves excellent handling properties and good comfort properties with simple means.

Preferably, the end portions of the rim flanges have a radial height of 0.15 to 0.55, preferably 0.2 to 0.3 times, the maximal tire height.

With the radially outwardly curved rim flange end portions with radially outwardly reduced stiffness, the transition between the wheel rim and the rim flanges as well as between the rim flanges and the sidewall portions remote from the rim flanges are made more uniform along the course of their support function and their flexibility so that rim flanges with especially wide radial extension can be provided. Such rim flanges with wide radial extension, even during handling, provide good comfort properties due to their own flexibility in the radially outer area and still provide a safe handling due to the axial support function extending over a wide portion of the tire sidewall. Preferred embodiments of such end portions of the rim flanges having a reduced stiffness in the radially outer direction are provided by providing continuously tapering end portions or by providing end portions made of a flexible material such as an aluminum alloy, a magnesium alloy or a plastic material.

By embodying the vehicle wheel with a pneumatic vehicle tire which completely surrounds the wheel rim, the attachment of the pneumatic vehicle tire to the wheel rim is further improved. A unilateral breaking-away of a tire sidewall from the wheel flange is not possible. Furthermore, leakage problems at the connection between the pneumatic vehicle tire and the wheel rim are minimized.

Preferably, the pneumatic vehicle tire for the inventive wheel has a low aspect ratio of maximum height H/cross-sectional width B of less than or equal to 0.6.

It is especially advantageous to complement the end portions of the rim flanges so as to provide an emergency running surface (saddle). When a sudden air pressure loss occurs, the tire mantle can thus be supported on the emergency running surface.

Preferably, because this provides for an especially easy manufacture, the tire sidewall is vulcanized to the radially inner mounting surface of the wheel rim.

BRIEF DESCRIPTION OF THE DRAWINGS

The objects and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 7.

Figure 1:
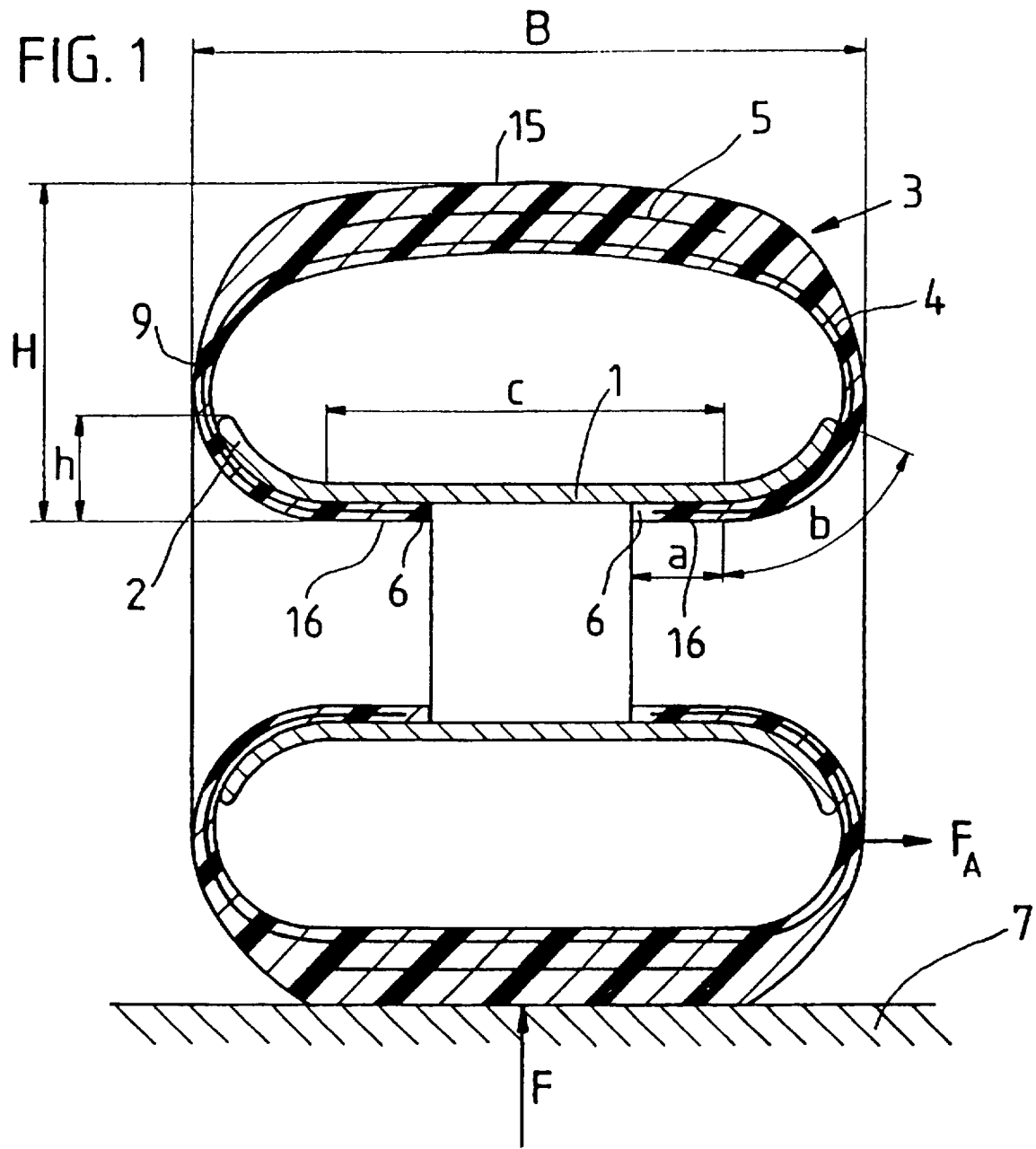
FIG. 1 shows a schematic representation of the inventive beadless pneumatic vehicle tire.

FIG. 1 shows a vehicle wheel with pneumatic vehicle tire 3 and inwardly positioned wheel rim 1 with a ratio of maximum height H to maximum width B of the pneumatic vehicle tire $H/B \leq 0.6$. The pneumatic vehicle tire 3 comprises an inner lining extending over the circumference of the tire from the left end 6 of the pneumatic vehicle tire to the right end 6. To the lining is applied a radial carcass 4 with, for example, two carcass plies. In the area of the tread portion a belt 5 of known construction is positioned radially outwardly of the carcass 4 and comprises, for example, two belt layers of reinforcement elements, for example, steel cord embedded in rubber. The belt extends over the entire circumference of the tire and extends in the axial direction from one shoulder area to the other. The steel cords extend at an acute angle of, for example, 10° to 30° to the circumferential direction. It is known to wind radially outwardly of the belt layer a non-represented belt overlay with reinforcement elements extending in the circumferential direction and comprised of, for example, nylon.

Radially outwardly of the belt, respectively, the belt overlay, a tread 15 extends in a manner known per se over the circumference of the tire from one shoulder area to the other shoulder area. The tread 15 is comprised of rubber material. In the sidewall area 9 rubber material is applied over the carcass 4. The sidewall rubber material extends from the shoulder area to the end 6.

The pneumatic vehicle tire 3 encloses with its end section 16 an inwardly positioned wheel rim 1 with radially outwardly curved end portions 2 at its axial ends. Between the curved rim flanges the wheel rim is substantially cylindrical providing a radially inner mounting surface. The curvature of the rim flanges corresponds to the desired tire contour in the area of the rim flanges. The end portions extend over radial height h which is between 0.15 and 0.55 times, preferably, 0.2 to 0.3, of the maximal tire height H. For example, in the shown embodiment h is 0.25 times H both measured from the radially innermost point along the tire height H when the tire is inflated to its standard inner pressure.

The end section 16 of the vehicle tire engages the rim 1 radially inwardly and extends over an axial length a within the substantially cylindrical extension c of the wheel rim 1.

In the area a the pneumatic vehicle tire with its end sections 16 is vulcanized to the cylindrical mounting surface of the wheel rim 1. In the area of the rim flanges 2 the tire sidewalls rest thereat with prestress. In order to prevent vulcanization in the area of the rim flanges, it is possible to provide a conventional non-stick agent in this area.

When the circumferential portion of the tire contacts the street surface 7, normal forces F act between the pneumatic vehicle tire 3 and the street surface 7. Upon damping of these forces, a resulting force $F_A$ acts on the sidewalls 9 of the tire, as shown by arrow $F_A$ in FIG. 1, in the substantially axial direction so that the sidewall is slightly deformed. Due to the selected prestress between the end portion 2 and the tire, the tire in this normal load situation still rests under reduction of the prestress at the rim flange 2. Upon driving through a curve, the prestress between the rim flange 2 and the tire sidewall 9 increases in the area of the especially greatly loaded outer side of the curve due to the introduced forces. The pneumatic vehicle tire 3 is thus stiffened at the greatly loaded sidewall by the rim flange. A secure handling is thus ensured.

When sudden strong impacts act on the pneumatic vehicle tire, greater resulting forces $F_A$ act on the sidewalls 9. They greatly deform the tire axially outwardly upon damping. The sidewall area available for flexible deformation extends from the shoulder area of the tread past the entire curved area b of the end portion 2 of the wheel rim. Upon being subjected to great impacts, the tire sidewall 9 lifts away from the end portion 2 and forms a gap 8 therebetween. The radius of curvature R which is available for damping by flexible deformation of the tire sidewall 9 is thus considerably greater than a comparable radius of curvature R' which is available for a conventionally mounted tire sidewall at a rim flange. For the purpose of comparison, a corresponding radius of curvature R' was included in FIG. 3 with a correspondingly acting resulting force $F_A$ acting on the sidewall.

It is also possible to reliably dampen impacts of great force acting on the tire, due to the great radius of curvature R and the very long curved sidewall surface extending between the tire shoulder and the cylindrical surface of the wheel rim, with minimal surface deformation of the curved sidewall.

Figure 2:
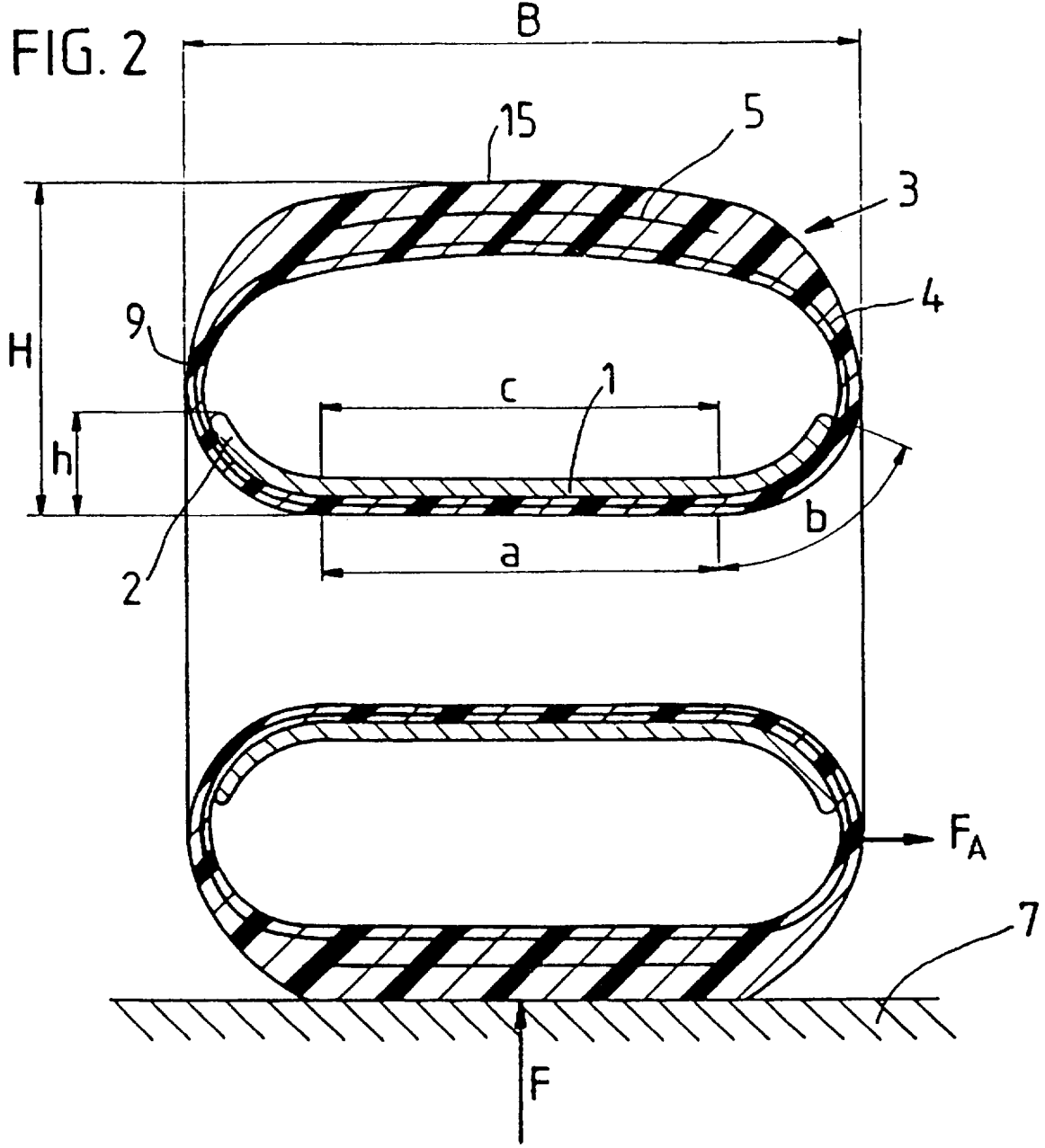
FIG. 2 shows a further embodiment in which the pneumatic vehicle tire completely surrounds the wheel rim.
Figure 3:
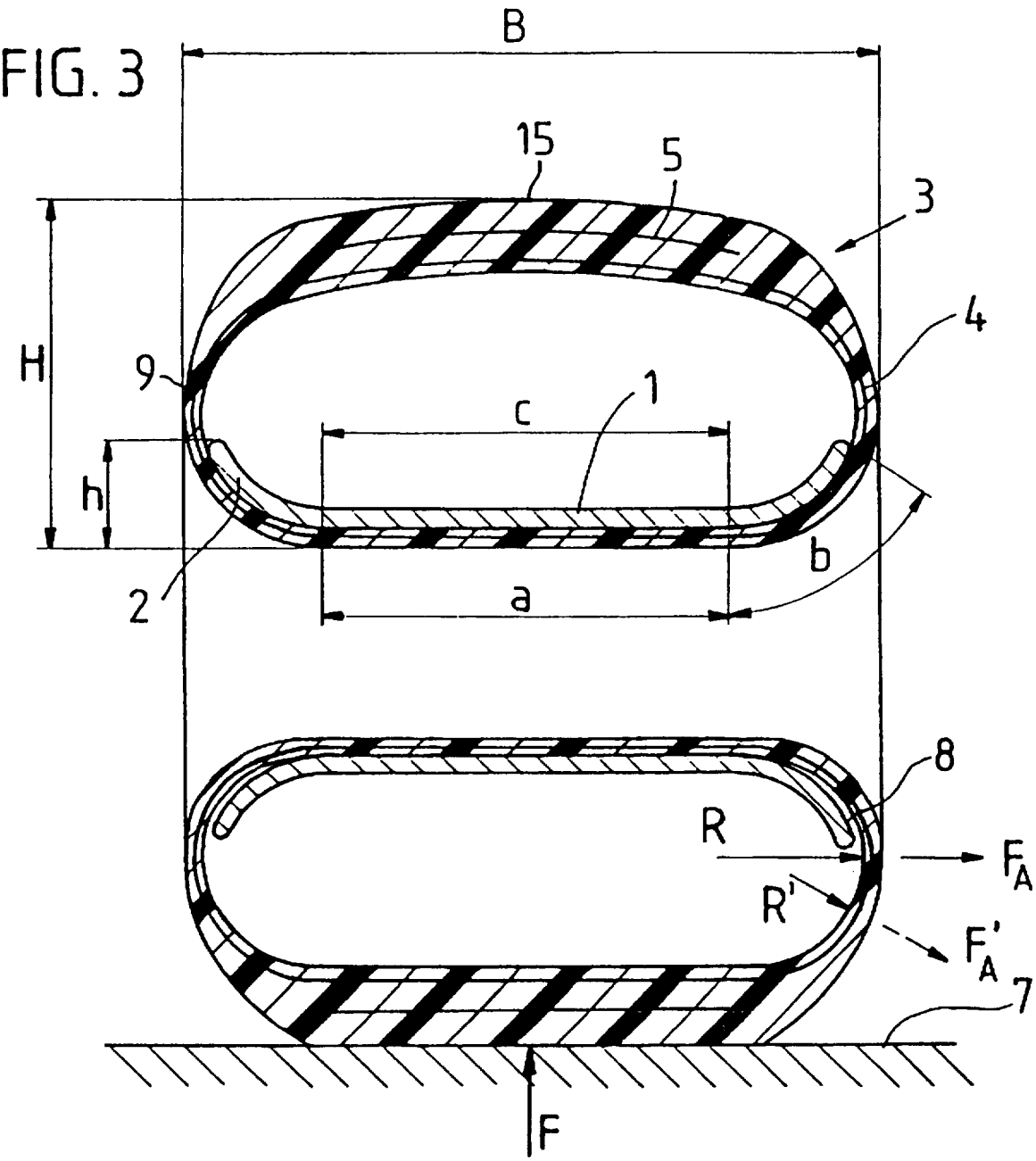
FIG. 3 shows a load situation with gap formation between the tire sidewall and the rim flanges.
Figure 4:
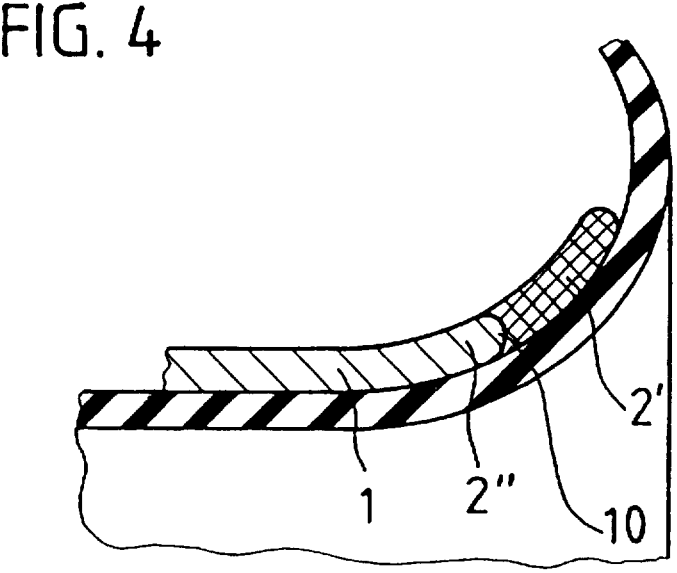
FIG. 4 shows a portion of the inventive vehicle wheel with rim flanges made of a flexible material.

As is represented in FIGS. 2 and 3, it is also possible to connect the ends 6 of the pneumatic vehicle tire radially within the wheel rim so that a closed surface results.

It is also possible to produce the rim flange 2 in its radially outer end portion 2' of a flexible material, for example, a flexible aluminum alloy or a flexible magnesium alloy and to mold this end portion 2" of the wheel rim at the connecting location 10 to the wheel rim. It is also possible to make this area out of a flexible plastic material whereby the plastic material can be connected to the stiff end portion 2" made of metal with known connecting means for metal/plastic connections, for example, with chemical means. For example, this is possible with a polyphenylene ether adhesive agent. The plastic material comprises an elastic plastic matrix and is reinforced with glass or plastic fibers.

Figure 5:
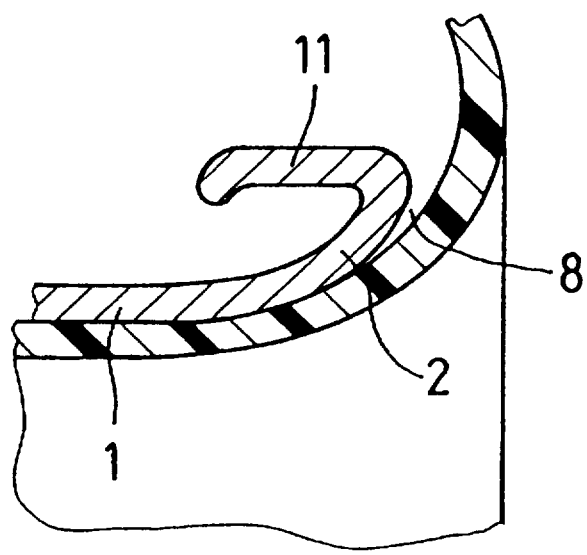
FIG. 5 shows a portion of an inventive pneumatic vehicle tire with rim flanges embodied as an emergency running surface.
Figure 6:
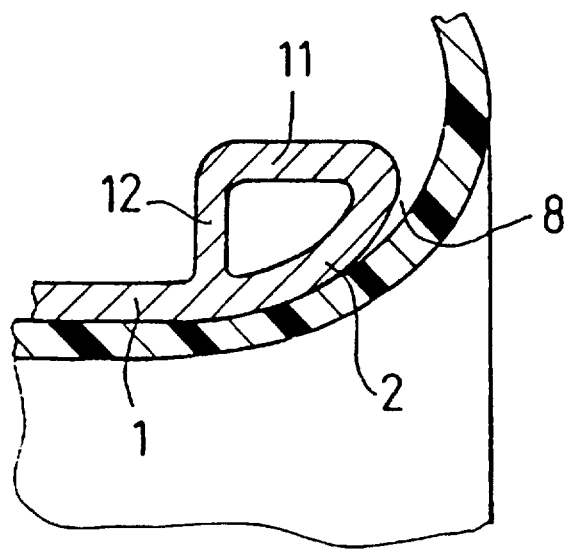
FIG. 6 shows a further embodiment of an inventive pneumatic vehicle tire with rim flanges embodied as an emergency running surface.

It is also possible, as shown in FIG. 5, to embody the rim flange 2 at its radially outer end portion with an axially inwardly extending emergency running surface (saddle) 11 which extends over the entire circumferential area of the tire. When a sudden inner pressure loss occurs, the tire will be supported with its tread portion on the substantially cylindrical surfaces providing the emergency running surface 11 at both axial ends of the wheel rim. A premature destruction and separation of the tire is thus avoided. Such an emergency running saddle 11 can be reinforced with further stays 12 if necessary, as shown in FIG. 6.

Figure 7:
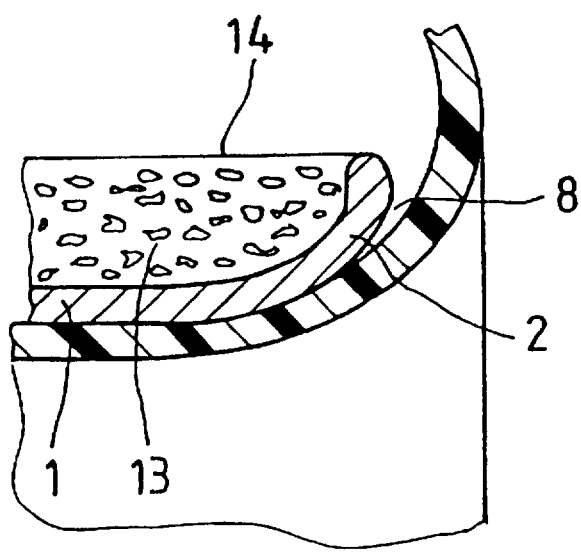
FIG. 7 shows yet another embodiment of an inventive pneumatic vehicle tire with rim flanges embodied as an emergency running surface.

In another embodiment, as shown in FIG. 7, it is suggested to cover the radially outer surface of the wheel rim with additional support material. Between the rim flanges 2 a cup-shaped depression formed between the rim flanges 2 and the radially outer surface of the wheel rim is filled with support material 13. The surface of the support material 13 forms a continuous cylindrical emergency running surface 14. The support material can be comprised of hard plastic, rubber, or plastic foam which for damping purposes is non-sensitive against impact and which has good gliding properties for emergency running operations.

It is also possible to provide vehicle wheels in which the wheel rims have an inventive rim flange only at the outer side of the vehicle so that at least during navigating curves the respectively highly loaded tire sidewall at the outer radius of the curve is axially supported.

The present invention is, of course, in no way restricted to the specific disclosure of the specification and drawings, but also encompasses any modifications within the scope of the appended claims.

What we claim is:
1. A vehicle wheel comprising:
   a wheel rim with a radially inwardly positioned mounting surface and rim flanges connected axially outwardly to opposite sides of said mounting surface;
   a beadless pneumatic vehicle tire with a carcass comprised of at least one carcass ply;
   said pneumatic vehicle tire having a tread and two sidewalls;
   said pneumatic vehicle tire |mounted on| vulcanized to said inner mounting surface of said wheel rim so as to substantially enclose said mounting surface of said wheel rim;
   said rim flanges each having a radially outwardly projecting end portion serving as axial contact surfaces for a respective one of said sidewalls, wherein said sidewalls are not fastened to said contact surfaces and lift away from said contact surfaces for damping forces acting on said vehicle wheel during driving.
2. A vehicle wheel according to claim 1, wherein said pneumatic vehicle tire has a maximum tire height H and wherein said end portions have a radial extension identical to 0.15 to 0.55 times said tire height H, both measured from the radially innermost point along said tire height H when the tire is inflated to its standard inner pressure.
3. A vehicle wheel according to claim 1, wherein said end portions have a radial extension identical to 0.2 to 0.3 times said tire height H.
4. A vehicle wheel according to claim 1, wherein said end portions are radially outwardly curved and wherein said end portions have a radially outwardly decreasing stiffness.
5. A vehicle wheel according to claim 1, wherein said end portions, in a cross-section taken in a plane of said wheel rim extending through a center axis of said vehicle wheel, have a contour continuously tapering in the radially outward direction.

6. A vehicle wheel according to claim 1, wherein said end portions are comprised of a flexible material, selected from the group consisting of an aluminum alloy, a magnesium alloy, and a plastic material, and are chemically connected to said wheel rim.

7. A vehicle wheel according to claim 1, wherein said pneumatic vehicle tire completely encloses said wheel rim.

8. A vehicle wheel according to claim 1, wherein said pneumatic vehicle tire has a height to width ratio of maximally 0.6.

9. A vehicle wheel comprising:

- a wheel rim with a radially inwardly positioned mounting surface and rim flanges connected axially to opposite sides of said mounting surface;
- a pneumatic vehicle tire with a carcass comprised of at least one carcass Ply;
- said pneumatic vehicle tire having a tread and two sidewalls;
- said pneumatic vehicle tire mounted on said inner mounting surface of said wheel rim so as to substantially enclose said mounting surface of said wheel rim;
- said rim flanges each having a radially outwardly projecting end portion serving as axial contact surfaces for a respective one of said sidewalls;
- wherein said end portions form an emergency running surface.

10. A vehicle wheel according to claim 9, wherein said pneumatic vehicle tire is vulcanized to said mounting surface.

* * * * *